United States Patent
Peña Rios et al.

(10) Patent No.: US 12,026,298 B2
(45) Date of Patent: Jul. 2, 2024

(54) INTERACTION-BASED RENDERING OF SPATIAL ENVIRONMENTS

(71) Applicant: British Telecommunications Public Limited Company, London (GB)

(72) Inventors: Anasol Peña Rios, London (GB); Tomas Oplatek, London (GB); Hani Hagras, London (GB); Anthony Conway, London (GB); Gilbert Owusu, London (GB)

(73) Assignee: British Telecommunications Public Limited Company United

( * ) Notice: Subject to any disclaimer, the term of this patent is extended or adjusted under 35 U.S.C. 154(b) by 41 days.

(21) Appl. No.: 17/758,910

(22) PCT Filed: Dec. 18, 2020

(86) PCT No.: PCT/EP2020/087120
§ 371 (c)(1),
(2) Date: Jul. 15, 2022

(87) PCT Pub. No.: WO2021/144118
PCT Pub. Date: Jul. 22, 2021

(65) Prior Publication Data
US 2022/0413597 A1    Dec. 29, 2022

(30) Foreign Application Priority Data

Jan. 15, 2020  (EP) .................... 20151862

(51) Int. Cl.
*G06T 15/00*  (2011.01)
*G06F 3/01*  (2006.01)

(52) U.S. Cl.
CPC .................... *G06F 3/011* (2013.01)

(58) Field of Classification Search
CPC .................... G06F 3/04815; G06F 3/011
(Continued)

(56) References Cited

U.S. PATENT DOCUMENTS

| | | | | |
|---|---|---|---|---|
| 11,553,011 B1* | 1/2023 | Zhang | ............. | H04L 65/1076 |
| 11,556,995 B1* | 1/2023 | Little | ............. | G06Q 40/08 |
| 11,594,257 B2* | 2/2023 | Conlin | ............. | G11B 27/06 |
| 11,636,659 B1* | 4/2023 | Little | ............. | G06Q 50/163 |
| | | | | 345/419 |
| 11,645,622 B1* | 5/2023 | Little | ............. | H04L 65/403 |
| | | | | 715/751 |

(Continued)

FOREIGN PATENT DOCUMENTS

| | | |
|---|---|---|
| EP | 3432129 A1 | 1/2019 |
| GB | 2561738 A | 10/2018 |

(Continued)

OTHER PUBLICATIONS

Almohammadi K., et al., "An Interval Type-2 Fuzzy Logic Based System with User Engagement Feedback for Customized Knowledge Delivery within Intelligent E-Learning Platforms," IEEE International Conference on Fuzzy Systems (FUZZ-IEEE), 2014, pp. 808-817.

(Continued)

*Primary Examiner* — Phu K Nguyen
(74) *Attorney, Agent, or Firm* — Pranger Law PC

(57) ABSTRACT

A computer implemented method of navigating a digital representation of a spatial environment by a user in which a portion of the digital representation is rendered by a rendering computer system for visualization by the user. The method including accessing a digital model of the spatial environment including a specification of each of a plurality of virtual resources in the spatial environment, each specification identifying at least a location of a resource in the spatial environment and at least one trigger criterion for determining when a resource is accessed by the user; monitoring the satisfaction of trigger criteria for the plurality of virtual resources; and responsive to the monitoring, determining the portion of the digital representation for rendering by the rendering computer system for visualization by the user.

10 Claims, 1 Drawing Sheet

(58) Field of Classification Search
USPC .......................................................... 345/418
See application file for complete search history.

(56) References Cited

U.S. PATENT DOCUMENTS

| | | | | |
|---|---|---|---|---|
| 11,677,908 | B2* | 6/2023 | Zhang | H04N 7/157 |
| | | | | 709/204 |
| 11,757,947 | B2* | 9/2023 | Little | H04L 65/1083 |
| | | | | 709/227 |
| 11,758,090 | B1* | 9/2023 | Little | H04N 7/157 |
| | | | | 348/14.08 |
| 11,775,552 | B2* | 10/2023 | Miller | G06F 16/287 |
| | | | | 707/738 |
| 2009/0222742 | A1 | 9/2009 | Pelton et al. | |
| 2014/0028712 | A1 | 1/2014 | Keating et al. | |
| 2015/0154291 | A1 | 6/2015 | Shepherd et al. | |
| 2017/0068323 | A1 | 3/2017 | West et al. | |
| 2017/0173262 | A1* | 6/2017 | Veltz | G16H 20/17 |
| 2018/0114372 | A1 | 4/2018 | Nagy et al. | |
| 2019/0005024 | A1 | 1/2019 | Somech et al. | |
| 2020/0042083 | A1 | 2/2020 | Min | |
| 2023/0009304 | A1* | 1/2023 | Jakobsson | G06Q 30/0241 |

FOREIGN PATENT DOCUMENTS

| | | |
|---|---|---|
| KR | 20190085894 A | 7/2019 |
| WO | WO-2018071190 A1 | 4/2018 |

OTHER PUBLICATIONS

Brockmyer J.H., et al., "The Development of the Game Engagement Questionnaire: A Measure of Engagement in Video game-playing," Journal of Experimental Social Psychology, vol. 45(4), 2009, pp. 624-634.

Combined Search and Examination Report under Sections 17 and 18(3) for Great Britain Application No. 2000563.3, dated Jul. 14, 2020, 6 pages.

Extended European Search Report for Application No. 20151862.8, dated Jul. 2, 2020, 9 pages.

International Search Report and Written Opinion for Application No. PCT/EP2020/087120 dated Feb. 26, 2021, 13 pages.

Martey R.M., et al., "Measuring Game Engagement: Multiple Methods and Construct Complexity," Simulation and Gaming, Available from https://doi.org/10.1177/1046878114553575, vol. 45(4-5), 2014, pp. 528-547.

Omale G., "Gartner Says 100 Million Consumers Will Shop in Augmented Reality Online and In-Store by 2020," Newsroom, Press Releases, Available from https://www.gartner.com/en/newsroom/press-releases/2019-04-01-gartner-says-100-million-consumers-will-shop-in-augme, Retrieved on Sep. 9, 2019, Apr. 1, 2019, 3 pages.

Oplatek T., "An Immersive Virtual Reality Lobby for Mobile Training," University of Essex, Aug. 2018, 69 pages.

Walker, "Customers 2020: A Progress Report," Available from https://www.walkerinfo.com/knowledge-center/featured-research-reports/customers-2020-a-progress-report, Sep. 9, 2019, 34 pages.

* cited by examiner

INTERACTION-BASED RENDERING OF SPATIAL ENVIRONMENTS

PRIORITY CLAIM

The present application is a National Phase entry of PCT Application No. PCT/EP2020/087120, filed Dec. 18, 2020, which claims priority from EP Patent Application No. 20151862.8, filed Jan. 15, 2020, each which is hereby fully incorporated herein by reference.

TECHNICAL FIELD

The present disclosure relates to the improvements to virtual and augmented reality applications.

BACKGROUND

The provision of, and navigation through, digital representations of spatial environments are increasingly common with growing industrial application. For example, virtual reality (VR) and augmented reality (AR) applications provide for the rendering of digital representations of spatial environments whether real-world space (augmented reality) or a virtual-world space (virtual reality) or, indeed, some combination of the two. Such environments find application in maintenance tasks where existing real-world items are overlaid with virtual content such as virtual objects, resources, media and the like. Such virtual content can be for passive consumption by a user, such as by reading, hearing, watching, and/or for active engagement by the user such as operating, handling, moving and the like.

Devices involved in the rendering of audio/visual representations of such digital representations of spatial environments can vary in nature and capability. Such devices can include smartphones and other small, pervasive devices. Additionally, or alternatively, such devices can include dedicated apparatus such as computer systems with VR or AR headsets. Other devices are also known, with a wide range of resources and capability such as memory, processing and network connectivity including bandwidth. In some cases, rendering or display devices are low-resource devices having constrained memory, processor and/or network bandwidth capabilities.

Accordingly, it is beneficial to provide for improved configuration and arrangement of content for rendering as part of a digital representation of a spatial environment for a user.

SUMMARY

According to a first aspect of the present disclosure, there is provided a computer implemented method of navigating a digital representation of a spatial environment by a user in which a portion of the digital representation is rendered by a rendering computer system for visualization by the user, the method comprising: accessing a digital model of the environment including a specification of each of a plurality of virtual resources in the environment, each specification identifying at least a location of a resource in the environment and at least one trigger criterion for determining when a resource is accessed by the user; monitoring the satisfaction of trigger criteria for the virtual resources; and responsive to the monitoring, determining the portion of the digital representation for rendering by the rendering computer system for visualization by the user.

In some embodiments, the digital representation includes a plurality of virtual objects, each virtual object including one of: media content; a data structure having a visual representation for rendering; and data for display, and wherein determining a portion of the digital representation for rendering includes determining a subset of the virtual objects for rendering, and wherein the virtual resources include at least a subset of the virtual objects.

In some embodiments, the trigger criterion for determining when a resource is accessed by the user includes one or more of: a duration of presence of the resource in a field of view of the user in the rendered digital representation; and an interaction by the user with the resource.

In some embodiments, the determining step is responsive to the monitoring based on: a measure of a period of access, by the user, to the rendered digital representation of the spatial environment; and a measure of a number of virtual resources for which trigger criteria have been satisfied during the period of access.

In some embodiments, the determining step is responsive to the monitoring by the steps of: applying at least one fuzzy logic classifier to characteristics of the user's access to the spatial environment; and accessing a set of rules for the classified user access to determine the portion of the digital representation for rendering.

In some embodiments, the determined portion of the digital representation for rendering is classified by a fuzzy logic classifier to one or a set of classes of portions of digital representation.

In some embodiments, characteristics of the user's access to the spatial environment include one or more of: a number of resources accessed by the user; and a proportion the user's time navigating the rendered environment during which resources are accessed by the user.

In some embodiments, the spatial environment is one of: a real-world space and the rendering computer system is part of an augmented reality system; and a virtual-world space and the rendering computer system is part of a virtual reality system.

According to a second aspect of the present disclosure, there is a provided a computer system including a processor and a memory storing computer program code for performing the method set out above.

According to a third aspect of the present disclosure, there is a provided a computer program element comprising computer program code to, when loaded into a computer system and executed thereon, cause the computer system to perform the method set out above.

BRIEF DESCRIPTION OF THE DRAWINGS

Embodiments of the present disclosure will now be described, by way of example only, with reference to the accompanying drawings, in which.

DETAILED DESCRIPTION

Figure 1:
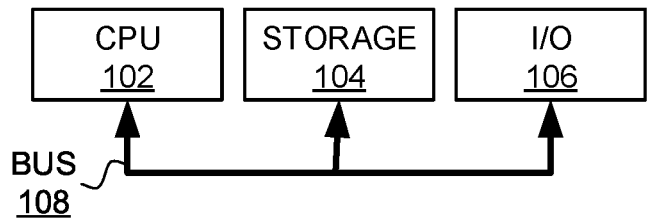
FIG. 1 is a block diagram of a computer system suitable for the operation of embodiments of the present disclosure.

FIG. 1 is a block diagram of a computer system suitable for the operation of embodiments of the present disclosure.

A central processor unit (CPU) 102 is communicatively connected to a storage 104 and an input/output (I/O) interface 106 via a data bus 108. The storage 104 can be any read/write storage device such as a random-access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

A digital representation of a spatial environment is provided according to which the environment is modelled using, for example, virtual objects such as Building Information Model (BIM) objects as are known in the art. Such virtual objects can be provided as digital representations of objects and/or classes of object including a visualization suitable for rendering for a user. Thus, virtual objects can include a parametric digital representation of an entity such as an item, article, facility or building, and can include both visualization information and optionally behavioral information indicating a manner or nature of behavior of objects when rendered. For example, virtual objects can include, inter alia: media content; data structures having a visual representation for rendering; and data for display. In a simple example, a virtual object can be a simple image, piece of text or the like. More complex objects can be functional, interactive or dynamic. For example, objects with behaviors can include behavior information defining, inter alia: how an object reacts when interacted with; how objects interact between themselves; physical characteristics of an object that are not necessarily part of its visualization such as mass, friction, rigidity and the like; functions of an object such as behaviors, adaptations, processing or other functions; and other behaviors as will be apparent to those skilled in the art.

Thus, a rendered digital representation of a spatial environment for a user includes virtual objects and at least some of these virtual objects constitute virtual resources for access by a user navigating the environment. For example, access to virtual resources in the environment can include: a resource being viewed by a user; a resource being used by a user; a resource being touched by a user; etc. By way of example, a rendered environment including instructions to assist or inform a user can include textual, document or image virtual objects as virtual resources that can be viewed by the user. In an alternative example, a rendered environment can include virtual resources as virtual object representations of physical entities animated to inform a user of the constituents and operation thereof which can be executed by a user interacting therewith, and can be viewed by a user, both constituting access by the user to the resource.

Embodiments of the present disclosure render a portion of a digital representation of a spatial environment for navigation by a user. In particular, the portion for rendering is determined using methods according to embodiments of the present disclosure so as to provide a rendered environment based on a degree of access, by the user, to virtual resources in the environment. In this way, the extent of the digital environment rendered is determined directly by the access to virtual resources by the user such that, for example, greater degree of access can lead to rendering of fewer virtual objects, or a lesser degree of access can lead to rendering of more virtual objects. Such adaptations to the portion of the digital environment for rendering serve to improve the opportunity for engagement by the user with the resources in the environment.

Figure 2:
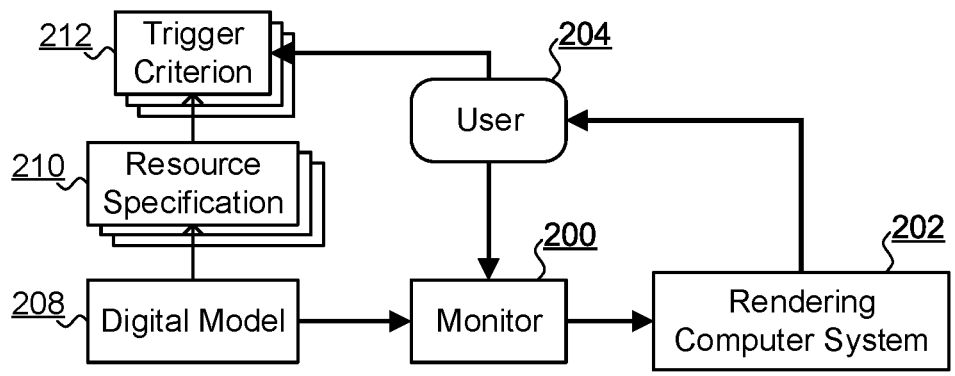
FIG. 2 is a component diagram of an arrangement for navigating a digital representation of a spatial environment by a user according to an embodiment of the present disclosure.

FIG. 2 is a component diagram of an arrangement for navigating a digital representation of a spatial environment by a user according to an embodiment of the present disclosure. A rendering computer system 202 is a hardware, software, firmware or combination component such as a physical or virtualized computer system for rendering a digital representation of a spatial environment for visualization by a user 204. Such rendered environments can additionally be provided for interaction by the user 204, and the rendering system 202 can be a resource-constrained device such as a portable, handheld or low-resource pervasive device. Alternatively, the rendering system 202 can be a dedicated VR or AR system including a headset or the like. Alternative suitable rendering systems 202 including systems in a range of capabilities between these examples can also be used.

The rendering system 202 renders a visualization of a portion of the environment for the user 204 based on a digital representation of the environment. The digital representation is provided by way of a digital model 208 of the environment such as one or more data structures specifying the environment including virtual objects included therein. Each virtual object has associated a location and visualization information, for example. The digital model 208 includes a specification 210 of virtual resources therein, each virtual resource being a virtual object or a type of virtual object.

Associated with each virtual resource 210 is one or more trigger criteria 212 for determining when the virtual resource 210 is accessed by a user. For example, a trigger criterion 212 can indicate that a virtual resource 210 is accessed by the user 204 when its rendered visualization appears in a field of view of the user 204 in a rendered digital representation of the spatial environment for a particular threshold duration. Additionally, or alternatively, the trigger criterion 212 can indicate that a virtual resource 210 is accessed by the user 204 when the user 204 interacts with it, such as by engaging a function, behavior or other interactivity with the virtual resource 210. Thus, access by the user 204 to a virtual resource 210 can be determined with reference to the trigger criteria 212.

A monitor 200 component is provided as a hardware, software, firmware or combination component for monitoring the satisfaction of the trigger criteria 212 by the user 204 in navigating the rendered digital representation. The monitor 200 determines a portion of the digital representation for rendering by the rendering system 202 for visualisation by the user 204. The determination, by the monitor 200, is based on the satisfaction of the trigger criteria 212 and, therefore, based on an extent, degree, frequency or other feature of access by the user 204 of the virtual resources in the rendered digital representation.

For example, the monitor 200 can determine the portion of the digital representation for rendering by the rendering system 202 based on, inter alia: a measure of a period of access, by the user 204, to the rendered digital representation of the spatial environment; and/or a measure of a number of virtual resources for which trigger criteria 212 have been satisfied during the period of access. Thus, in one exemplary embodiment, a failure to meet a threshold degree of access to virtual resources in the rendered environment can cause a rendering of an increased portion of the environment by the rendering system 202.

The portion of the environment rendered refers, for example, to a number of virtual objects (which can include virtual resources) rendered by the rendering system 202 such that a subset of all virtual objects indicated in the digital representation of the spatial environment are selected for rendering, and the number of objects in such subset can be increased when the portion increases. Similarly, the number of objects in such subset can be decreased when the portion decreases. Such adaptations to the portion of the digital representation of the environment rendered can be made periodically or responsive to events, criteria or other triggers.

In one embodiment, the determination by the monitor 200 of the portion of the digital representation for rendering is made based on the application of one or more fuzzy logic classifiers, such classifiers being known to those skilled in the art. For example, a fuzzy logic classifier can be applied to one or more characteristics of the user's access to the spatial environment, such as: a number of virtual resources accessed by the user 204; and a proportion the user's time spent navigating the rendered environment during which resources are accessed by the user 204. Further, a set of rules for such classified user access can be provided to determine the portion of the digital representation for rendering.

In one embodiment, the determined portion of the digital representation for rendering is itself classified by a fuzzy logic classifier to one or a set of classes of portions of digital representation. For example, an enumeration of a portion can be used, where each element in the enumeration is predefined to relate to a portion such as a number of virtual objects for rendering, such as an enumeration including: low, medium and high numbers of objects.

Figure 3:
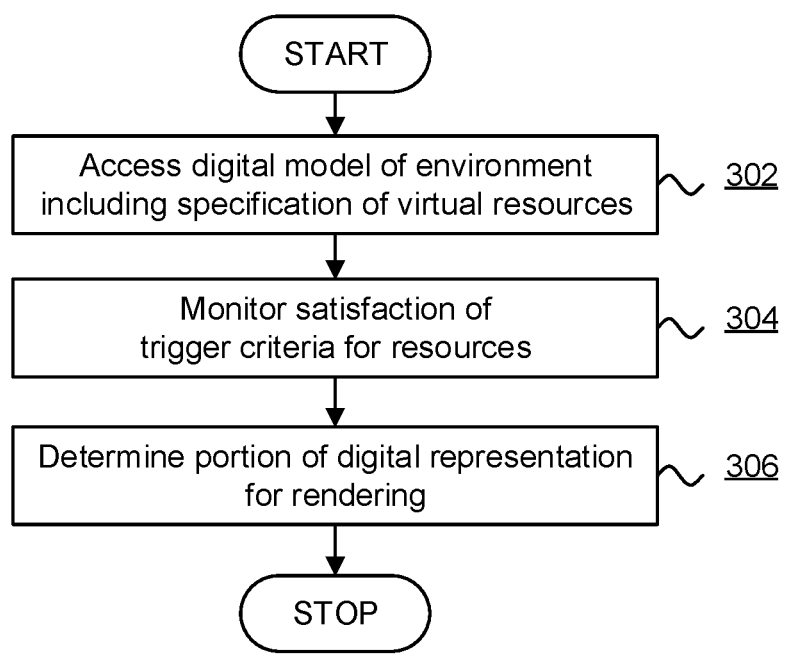
FIG. 3 is a flowchart of a method for navigating a digital representation of a spatial environment by a user according to an embodiment of the present disclosure.

FIG. 3 is a flowchart of a method for navigating a digital representation of a spatial environment by a user according to an embodiment of the present disclosure. Initially, at step 302, the method accesses a digital model 208 of a spatial environment including a specification 210 of each of virtual resources. At step 304 the method monitors the satisfaction of trigger criteria 212 for the virtual resources. At step 306 a portion of the digital representation for rendering by the rendering system 202 is determined based on the monitoring at step 304.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present disclosure has been described in relation to the above described example embodiments, the invention is not limited thereto and that there are many possible variations and modifications which fall within the scope of the disclosure.

The scope of the present disclosure includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented method of navigating a digital representation of a spatial environment by a user in which a portion of the digital representation is rendered by a rendering computer system for visualization by the user, the method comprising:
   accessing a digital model of the spatial environment including a specification of each of a plurality of virtual resources in the spatial environment, each specification identifying at least a location of a virtual resource in the spatial environment and at least one trigger criterion for determining when the virtual resource is accessed by the user;
   monitoring the satisfaction of trigger criteria for the plurality of virtual resources; and
   responsive to the monitoring, determining the portion of the digital representation for rendering by the rendering computer system for visualization by the user.

2. The method of claim 1, wherein the digital representation includes a plurality of virtual objects, each virtual object including one of: media content; a data structure having a visual representation for rendering; and data for display, and wherein determining the portion of the digital representation for rendering includes determining a subset of the virtual objects for rendering, and wherein the virtual resources include at least a subset of the virtual objects.

3. The method of claim 1, wherein the trigger criterion for determining when the virtual resource is accessed by the user includes one or more of: a duration of presence of the virtual resource in a field of view of the user in the rendered digital representation; and an interaction by the user with the virtual resource.

4. The method of claim 1, wherein the determining is responsive to the monitoring based on: a measure of a period of access, by the user, to the rendered digital representation of the spatial environment; and a measure of a number of virtual resources for which trigger criteria have been satisfied during the period of access.

5. The method of claim 1, wherein the determining is responsive to the monitoring by:
   applying at least one fuzzy logic classifier to characteristics of the user's access to the spatial environment; and
   accessing a set of rules for the classified user access to determine the portion of the digital representation for rendering.

6. The method of claim 5, wherein the determined portion of the digital representation for rendering is classified by a fuzzy logic classifier to one or a set of classes of portions of digital representation.

7. The method of claim 5, wherein characteristics of the user's access to the spatial environment include one or more of: a number of virtual resources accessed by the user; and a proportion of the user's time navigating the rendered digital representation of the spatial environment during which virtual resources are accessed by the user.

8. The method of claim 1, wherein the spatial environment is one of: a real-world space and the rendering computer system is part of an augmented reality system; and a virtual-world space and the rendering computer system is part of a virtual reality system.

9. A computer system including a processor and a memory storing computer program code for performing the method of claim 1.

10. A non-transitory computer-readable storage element storing computer program code to, when loaded into a computer system and executed thereon, cause the computer system to perform the method of claim 1.

* * * * *